Patented Dec. 14, 1926.

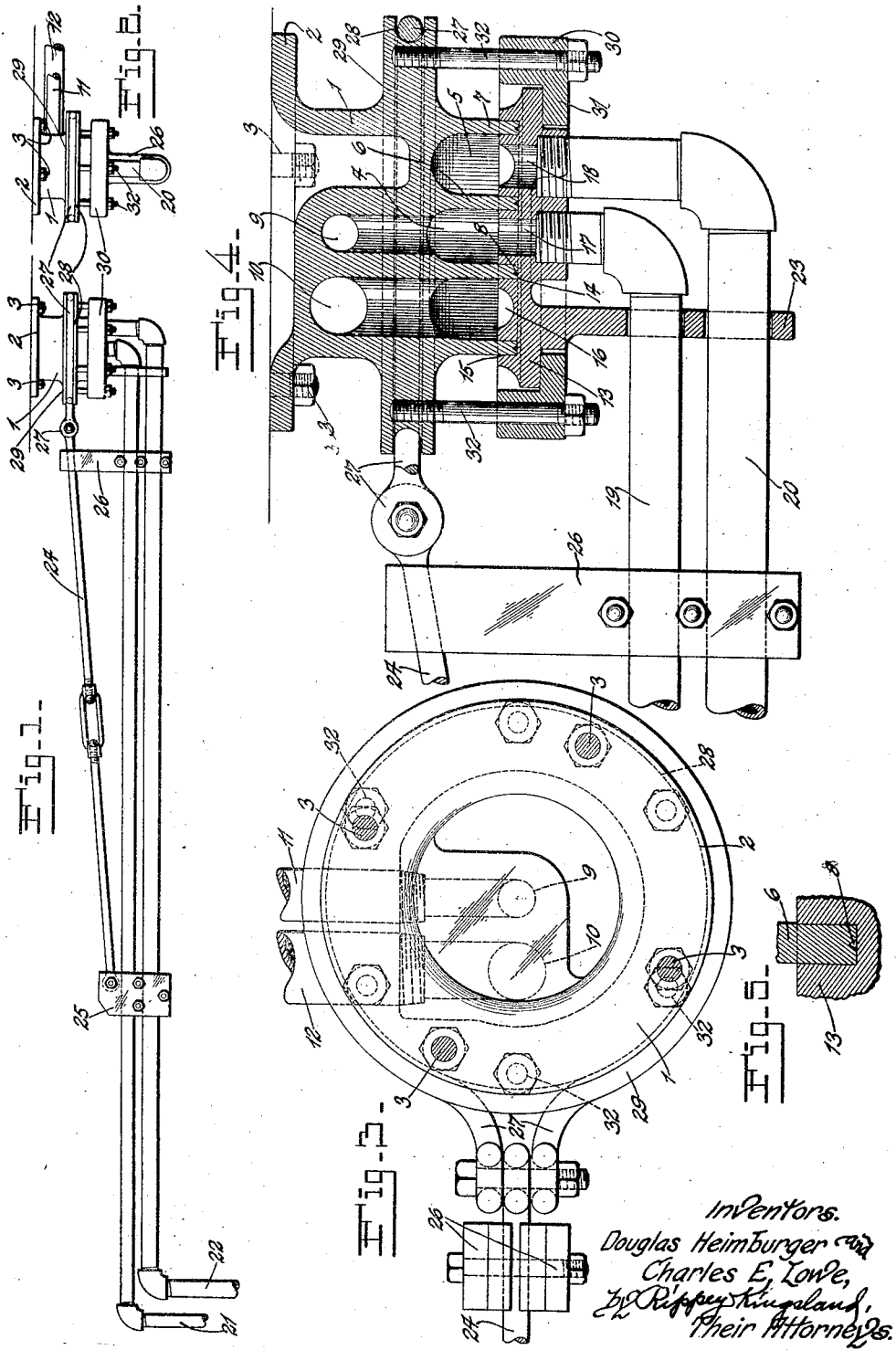

1,610,604

UNITED STATES PATENT OFFICE.

DOUGLAS HEIMBURGER, OF WEBSTER GROVES, AND CHARLES E. LOWE, OF ST. LOUIS, MISSOURI.

SWIVELED PIPE HANGER.

Application filed October 16, 1925. Serial No. 62,809.

This invention relates to improvements in swiveled pipe hangers and consists in the novel construction hereinafter disclosed.

An object of the invention is to provide a swiveled pipe hanger having a stationary member with inlets for a plurality of pipes and a member adapted to swivel on said stationary member, said swivel member having a plurality of outlets whereby the pipes connected therewith may be moved to different angular adjustments in respect of the stationary member.

Additional advantages of the construction will be apparent from the following detailed description thereof, taken in connection with the accompanying drawing in which—

Fig. 1 is a side elevation of the construction.

Fig. 2 is an end elevation taken at right angles to the structure as shown in Fig. 1.

Fig. 3 is a top plan view.

Fig. 4 is a vertical section through a portion of the device, and

Fig. 5 is a detail view illustrating the construction of the joint between the stationary and swivel members.

In the embodiment of the invention illustrated in the drawing, the device is shown as comprising a casing having a body portion 1, the upper wall of which terminates in a flange 2 which may be bolted to the ceiling of a building or other prominent support by bolts 3.

In the lower face of the member 1 is formed a plurality of concentric cavities forming chambers, and, as shown in the drawing, there are two chambers 4 and 5, although it will be understood that the number may be increased, if desired. These chambers are formed by the concentric circular walls 6 and 7, the lower edges of which are provided with V-shaped circular grooves 8.

In the upper part of the body 1 are angular passages 9 and 10 which communicate with the exterior of the stationary member at one end and with the chambers 4 and 5 respectively at the other end. Connected into the passages 9 and 10 are pipes 11 and 12 constituting supply pipes for different fluids. For instance, the device is particularly applicable for supplying compressed air, for example, through pipe 11 and water through pipe 12, thus providing fluids useful in washing automobiles, it being the purpose to secure the stationary member over the washing stand so that the discharge pipes may be swung in a circle above the vehicle being washed. While the purpose mentioned is a useful purpose of the device, it will be understood, of course, that it may be useful for many other and allied purposes.

The movable or swivel member of the device comprises a plate 13, in the upper wall of which there is formed the concentric vertical grooves 14 and 15 respectively. The lower edges of the walls 6 and 7 seat in said grooves, it being understood that in order to make the joints between the swivel member and the stationary member substantially fluid-tight, the surface of the walls 6 and 7 and the surface of the grooves 14 and 15 are machined to a tight fit, the grooves 8 seating in the bottom of the grooves 14 and 15 providing a seal for the fluid and preventing the escape between the stationary and swivel members. If desired, the upper face of the plate 13 between the grooves 14 and 15 may be cut out to form a concave channel 16. Vertical passages 17 and 18 are formed in the plate 13, said passages being positioned respectively so that the passage 17 communicates with the chamber 4 and the passage 18 communicates with the chamber 5. Angularly extending pipes 19 and 20 are connected into the passages 17 and 18 respectively, said pipes extending laterally from the hanger and being of any convenient or desired length. The pipes 19 and 20 have downwardly extending branches 21 and 22 respectively to which a hose or other flexible connection may be attached, if desired.

The pipes 19 and 20 are supported by a strap 23 formed integral with the plate 13 and are also laterally braced and supported by a tie rod 24 connected at its outer end to a bracket 25 that embraces and clamps the two pipes 19 and 20, and also by a bracket 26 that clamps the pipes 19 and 20 and connects them with the rod 24 near the hanger. The tie rod 24 is connected directly to the stationary part of the hanger by a bail 27 that seats in a groove 28 and a flange 29 formed integral with the member 1.

The plate 13 is held in association with the stationary member by a bearing that comprises a ring 30 and a flange 31, the flange 31 fitting under the plate and bearing against the lower face thereof near the marginal edge. The bearing for the plate holds the plate in clamped engagement with the lower edge of the stationary member, the clamping connection being effected by bolts 32 that pass through the ring 30 and extend into the underface of the flange 29.

From the foregoing description, it will be understood that the swivel member of the hanger may be rotated around the stationary member and thereby permit the pipes 19 and 20 to assume any required angular adjustment. It is further understood that the pipes may thus be conveniently supported on the ceiling of a building.

We are aware that the invention may be modified in certain particulars without departure from the spirit and scope thereof, and we do not limit ourselves therefore to the exact structure shown and described, but what we claim and desire to secure by Letters Patent is:

1. A pipe hanger comprising a stationary member having two passages therein, a chamber in said member having communication with one of said passages and surrounding and being out of communication with the other passage, a support rigidly connected with said member, a plate mounted on said support and abutting the outer end of said member and having grooves receiving the walls of said chamber forming swivel connection with said member and having two passages therethrough opening into said chamber and said passage through said member surrounded by said chamber respectively, and a pipe communicating with each of said passages through said plate.

2. A pipe hanger comprising a stationary member having two passages therein, a chamber in said member having communication with one of said passages and surrounding and being out of communication with the other passage, a support rigidly connected with said member, a plate mounted on said support and having swivel connection with said member and having two passages therethrough opening into said chamber and said passage through said member surrounded by said chamber respectively, a pipe communicating with each of said passages through said plate, and a part rigid with said plate and engaging said pipes at a distance from the connection of said pipes with said plate.

3. A pipe hanger comprising a stationary member having two passages therein, a chamber in said member having communication with one of said passages and surrounding and being out of communication with the other passage, a support rigidly connected with said member, a plate mounted on said support and abutting the outer end of said member and having grooves receiving the walls of said chamber forming swivel connection with said member and having two passages therethrough opening into said chamber and said passage through said member surrounded by said chamber respectively, a pipe communicating with each of said passages through said plate, and a rod having one end connected with said pipes at a distance from said member and said plate and having the other end pivoted to said stationary member.

4. A pipe hanger comprising a stationary member having a passage therethrough and another passage therein, a chamber in said member in communication with said second passage and surrounding and out of communication with said first passage, a support rigidly and detachably connected with said member, a plate rotatively mounted on said support and having swivel connection with said member and having two passages therethrough one of which opens into said first named passage through said member and the other of which opens into said chamber, pipes opening through said passages through said plate respectively, and a part rigid with said plate and engaging said pipes at a distance from said plate.

5. A pipe hanger comprising a stationary member having a passage therethrough and another passage therein, a chamber in said member in communication with said second passage and surrounding and out of communication with said first passage, a support rigidly and detachably connected with said member, a plate rotatively mounted on said support and having swivel connection with said member and having two passages therethrough one of which opens into said first named passage through said member and the other of which opens into said chamber, pipes opening through said passages through said plate respectively, a part rigid with said plate and engaging said pipes at a distance from said plate, and a rod having one end connected with said pipes at a distance from said plate and the other end pivoted to said stationary member concentrically with the axis of swivel rotation with said plate.

6. A pipe hanger comprising a stationary member having two passages therein, a chamber in said member having communication with one of said passages and surrounding and being out of communication with the other passage, a plate abutting against the outer end of said member and having grooves receiving the walls of said chamber for swivel turning movements with respect to said member and having two passages therethrough opening into said chamber and said passage through said member surrounded by said chamber respectively, and means for supporting said plate as aforesaid.

DOUGLAS HEIMBURGER.
CHARLES E. LOWE.